US012599972B2

(12) United States Patent
Zhou et al.

(10) Patent No.: US 12,599,972 B2
(45) Date of Patent: \*Apr. 14, 2026

(54) CHUCK WITH SLIP PROTECTION

(71) Applicants: JACOBS CHUCK MANUFACTURING (SUZHOU) COMPANY LTD., Suzhou (CN); APEX BRANDS, INC., Apex, NC (US)

(72) Inventors: Jichun Zhou, Suzhou (CN); Tingwei Zeng, Suzhou (CN); Michael C. Goodson, Belton, SC (US)

(73) Assignees: JACOBS CHUCK MANUFACTURING (SUZHOU) COMPANY LTD., Suzhou (CN); APEX BRANDS, INC., Apex, NC (US)

(*) Notice: Subject to any disclaimer, the term of this patent is extended or adjusted under 35 U.S.C. 154(b) by 723 days.

This patent is subject to a terminal disclaimer.

(21) Appl. No.: 17/401,723

(22) Filed: Aug. 13, 2021

(65) Prior Publication Data

US 2021/0370414 A1 Dec. 2, 2021

Related U.S. Application Data

(63) Continuation of application No. 16/340,218, filed as application No. PCT/CN2016/102075 on Oct. 14, 2016, now Pat. No. 11,123,806.

(51) Int. Cl.
*B23B 31/12* (2006.01)

(52) U.S. Cl.
CPC ........ *B23B 31/1238* (2013.01); *B23B 31/123* (2013.01); *B23B 2231/38* (2013.01); *B23B 2260/008* (2013.01)

(58) Field of Classification Search
CPC .............. B23B 31/1238; B23B 31/123; B23B 2231/38
See application file for complete search history.

(56) References Cited

U.S. PATENT DOCUMENTS

| | | | |
|---|---|---|---|
| 5,044,643 A | 9/1991 | Nakamura | |
| 5,125,673 A | 6/1992 | Huff et al. | |

(Continued)

FOREIGN PATENT DOCUMENTS

| | | |
|---|---|---|
| CA | 2227596 A1 | 2/1997 |
| CN | 1494970 A | 5/2004 |

(Continued)

OTHER PUBLICATIONS

International Search Report and Written Opinion from related International Application No. PCT/CN2016/102075 dated Apr. 19, 2018, all pages cited in its entirety.

*Primary Examiner* — Eric A. Gates
(74) *Attorney, Agent, or Firm* — BURR & FORMAN

(57) ABSTRACT

A chuck is provided for use with a powered driver having a rotatable drive shaft. The chuck includes a plurality of jaws movably disposed in passageways of a cylindrical body, a nut rotatably mounted about the body and in communication with the jaws such that rotation of the nut in a closing direction moves the jaws toward each other and rotation of the nut in an opening direction moves the jaws away from each other, and a sleeve rotatably mounted about the body. The sleeve is in communication with the nut such that rotation of the sleeve rotationally drives the nut. The chuck also including a biasing element disposed between the nut an at least a portion of the sleeve configured to bias the sleeve toward a neutral position. The biasing element limits an inertial force of the sleeve applied to the nut during operation of the powered driver.

20 Claims, 14 Drawing Sheets

(56)                    References Cited

U.S. PATENT DOCUMENTS

| | | | |
|---|---|---|---|
| 5,193,824 | A | 3/1993 | Salpaka |
| 5,322,303 | A | 6/1994 | Nakamura |
| 5,615,899 | A | 4/1997 | Sakamaki |
| 5,934,689 | A | 8/1999 | Montjoy |
| 6,260,856 | B1 | 7/2001 | Temple-Wilson |
| 6,390,481 | B1 | 5/2002 | Nakamura |
| 6,902,172 | B2 | 6/2005 | Röhm |
| 7,708,288 | B2 | 5/2010 | Bordeianu et al. |
| 7,900,937 | B2 | 3/2011 | Yaksich |
| 2004/0032095 | A1 | 2/2004 | Rohm |
| 2005/0230926 | A1 | 10/2005 | Sakamaki et al. |
| 2006/0027979 | A1 | 2/2006 | Yang et al. |
| 2012/0007322 | A1 | 1/2012 | Sakamaki et al. |
| 2012/0126495 | A1 | 5/2012 | Garber et al. |
| 2013/0277923 | A1 | 10/2013 | Campbell et al. |
| 2014/0077463 | A1 | 3/2014 | Mason |

FOREIGN PATENT DOCUMENTS

| | | | | | |
|---|---|---|---|---|---|
| CN | 1903514 | A | 1/2007 | | |
| CN | 200957459 | Y | 10/2007 | | |
| CN | 101829799 | A | 9/2010 | | |
| FR | 2886183 | A1 * | 12/2006 | ............. | B23B 1/123 |
| GB | 2361201 | A | 10/2001 | | |
| GB | 2429668 | A | 3/2007 | | |
| GB | 2451930 | A | 2/2009 | | |
| GB | 2426944 | B | 9/2010 | | |
| WO | 9814294 | A1 | 4/1998 | | |
| WO | 0245890 | A2 | 6/2002 | | |
| WO | 2006125146 | A2 | 11/2006 | | |

* cited by examiner

CHUCK WITH SLIP PROTECTION

TECHNICAL FIELD

Example embodiments generally relate to chucks for use with drills or with electric or pneumatic power drivers, and more particularly, relate to a chuck of the keyless type, which may be tightened or loosened by hand or actuation of the driver motor.

BACKGROUND

Both hand and electric or pneumatic tool drivers are well known. Although twist drills are the most common tools on such drivers, the tools may also comprise screw drivers, nut drivers, burrs, mounted grinding stones, and other cutting or abrading tools. Each of the tools may include a tool shank to operably couple the tool to the driver. Since the tool shanks may be of varying diameter or of polygonal cross section, the driver is usually provided with a chuck adjustable over a relatively wide range. The chuck may be attached to the driver by a threaded or tapered bore.

A variety of chucks have been developed in the art. In an oblique jawed chuck, a chuck body includes three passageways disposed approximately 120 degrees apart from each other. The passageways are configured so that their center lines meet at a point along the chuck axis forward of the chuck. The passageways constrain three jaws which are moveable in the passageways to grip a cylindrical or polygonal tool shank displaced approximately along the chuck center axis. The chuck includes a nut that rotates about the chuck center and that engages threads on the jaws so that rotation of the nut moves the jaws in either direction along the center lines within the passageways. The body chuck is attached onto the drive shaft of a driver and is fixed relative the driver. The nut is configured to rotate relative to the body when the driver is turned. The body may be configured so that rotation of the body in one direction with respect to the nut forces the jaws into gripping relationship with the tool shank, while rotation in the opposite direction releases the gripping relationship. The chuck may be keyless if the nut can be rotated by hand. Examples of such chucks are disclosed in U.S. Pat. Nos. 5,125,673 and 5,193,824, commonly assigned to the present assignee and the entire disclosures of which are incorporated by reference herein. Various configurations of keyless chucks are known in the art and are desirable for a variety of applications.

SUMMARY OF SOME EXAMPLES

According to some example embodiments, a chuck for use with a powered driver having a rotatable drive shaft, the chuck including a body having a nose section and a tail section, the tail section being configured to rotate with the drive shaft and the nose section having an axial bore formed therein and a plurality of passageways formed therethrough and intersecting the axial bore, a plurality of jaws movably disposed in the passageways, a nut rotatably mounted about the body and in operative communication with the jaws such that rotation of the nut in a closing direction moves the jaws toward a axis of the axial bore and rotation of the nut in an opening direction moves the jaws away from the axis; and a sleeve rotatably mounted about the body. The sleeve is in operative communication with the nut so that rotation of the sleeve rotationally drives the nut. The chuck also includes a biasing element disposed between the nut and at least a portion of the sleeve. The biasing element being configured to bias the sleeve toward a neutral position. The biasing element limits an inertial force of the sleeve applied to the nut during operation of the powered driver.

BRIEF DESCRIPTION OF THE DRAWINGS

Figure 1:
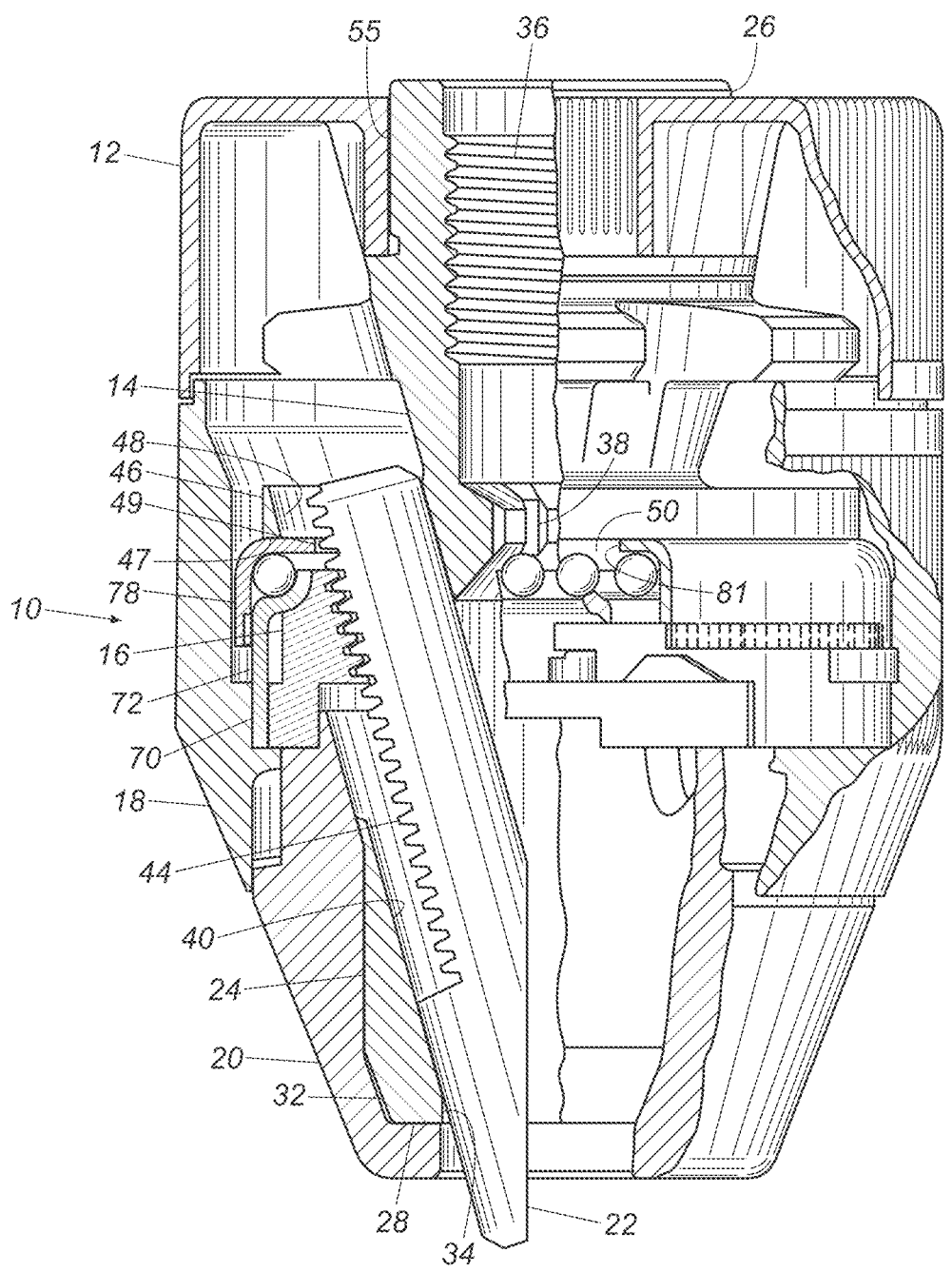
Figure 2:
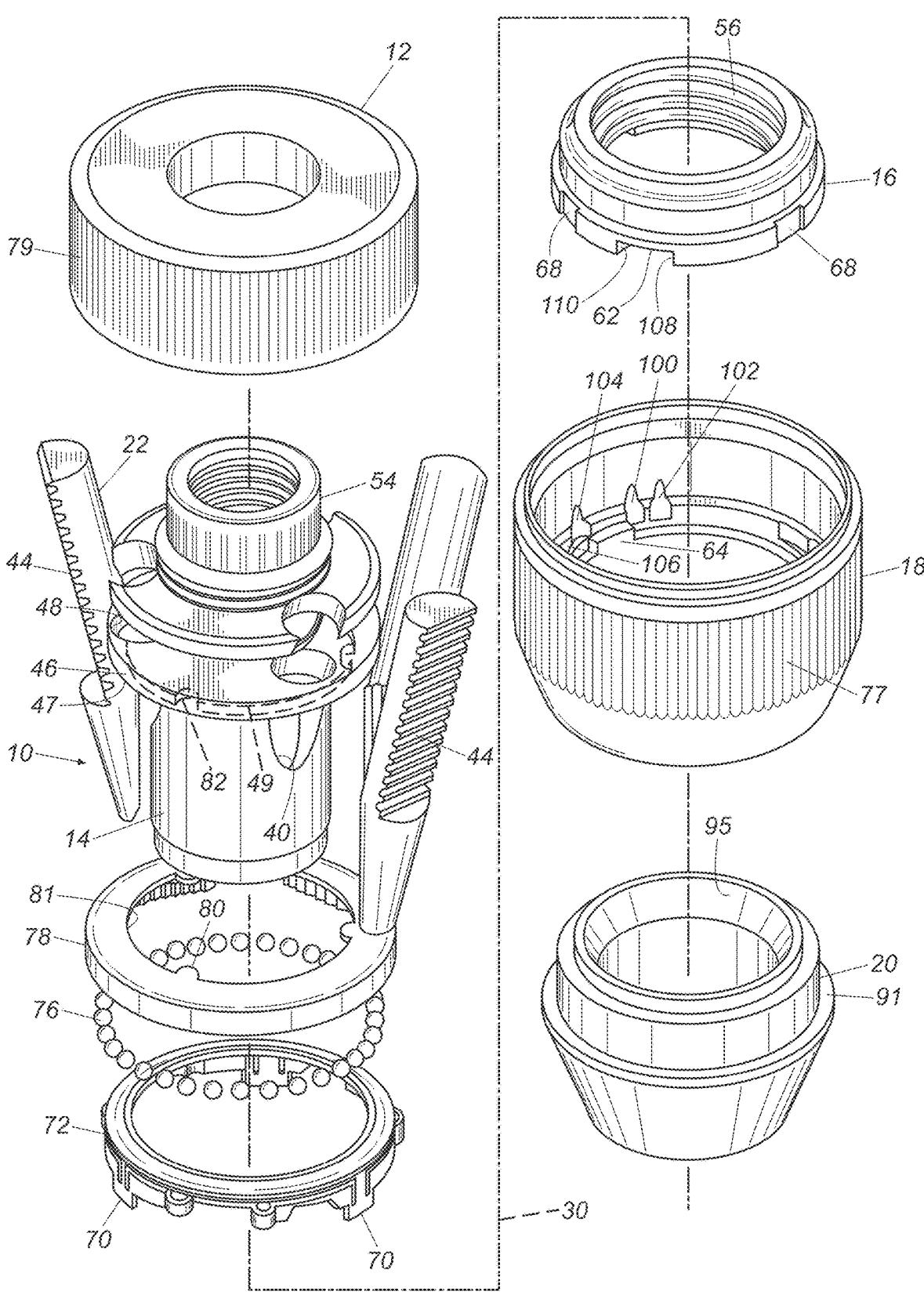
Figure 3:
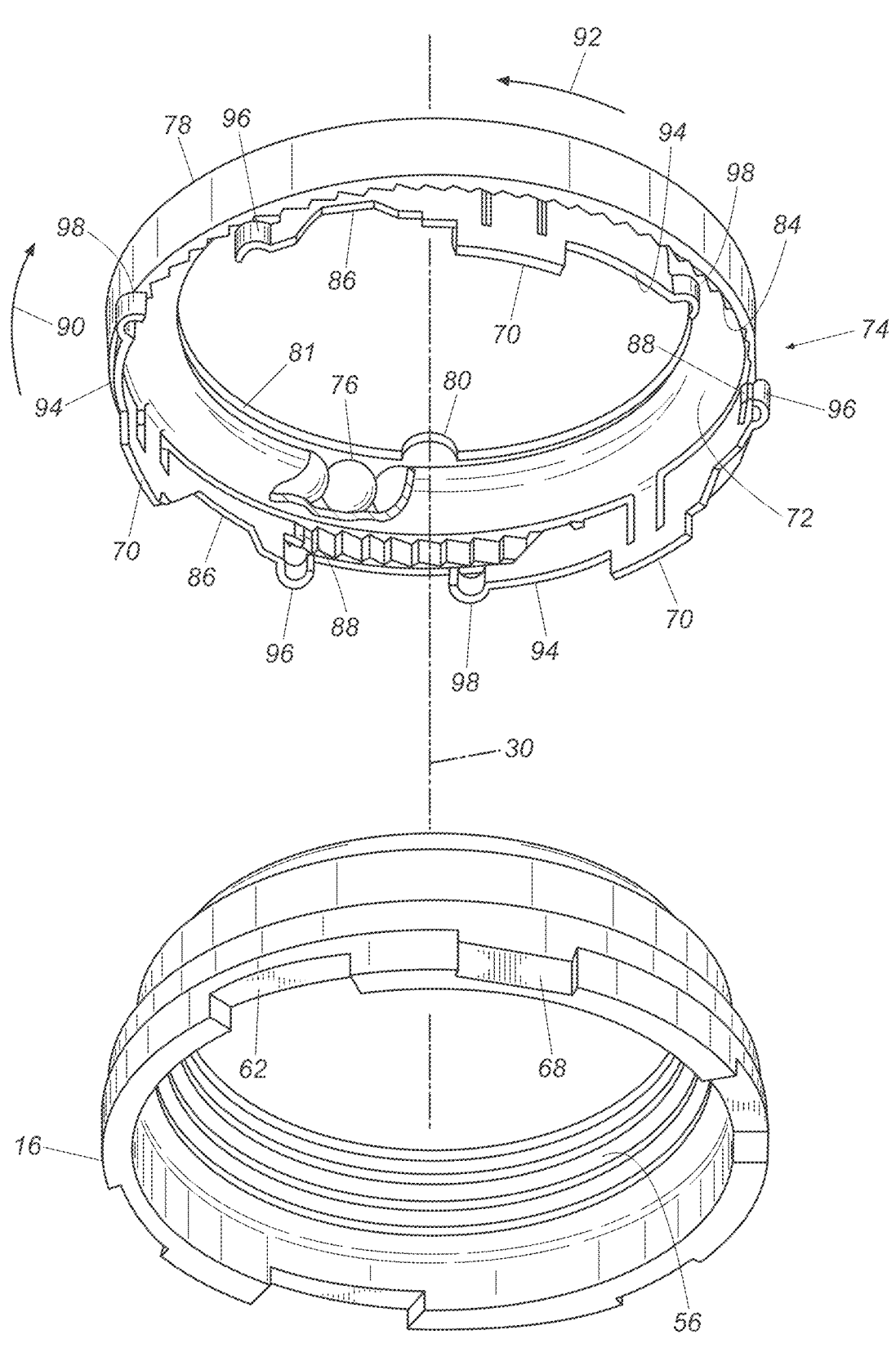
Figure 4A:
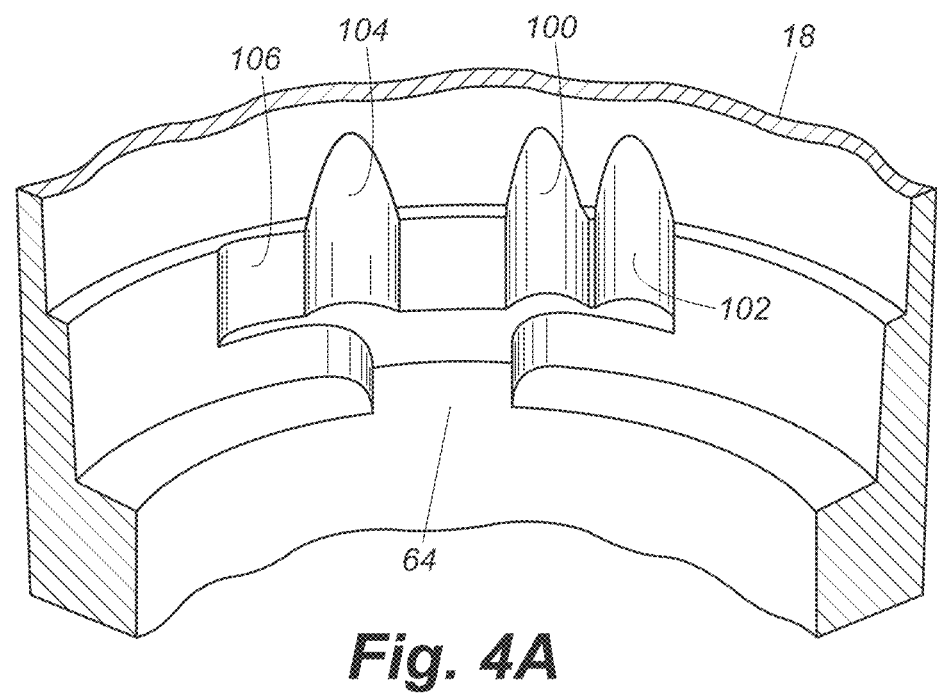
Figure 4B:
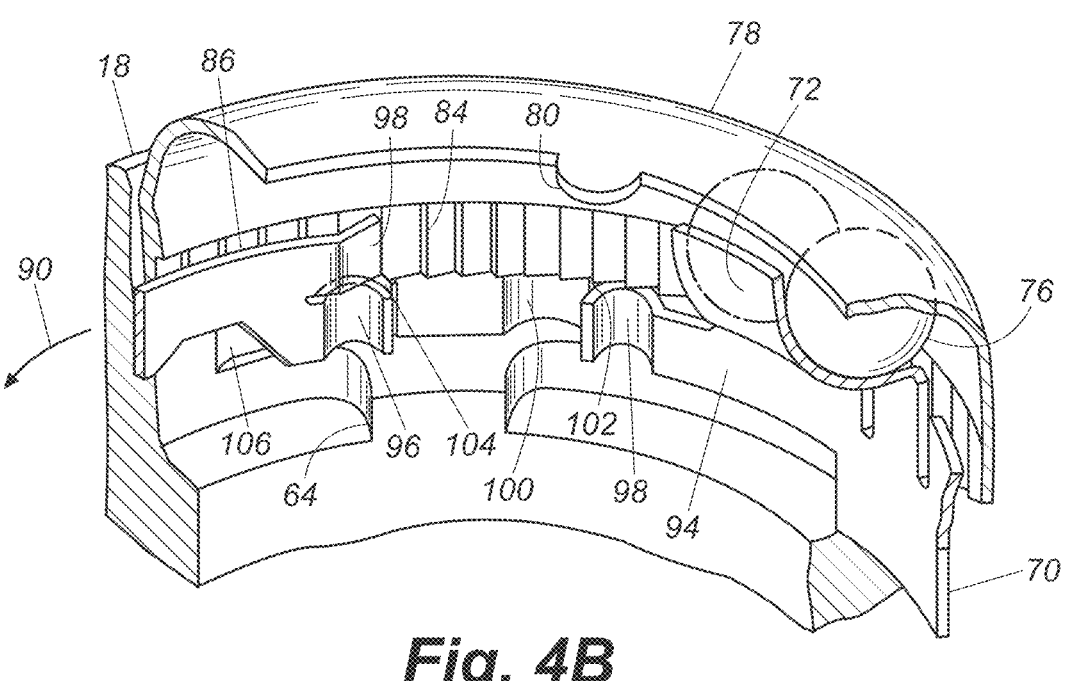
Figure 4C:
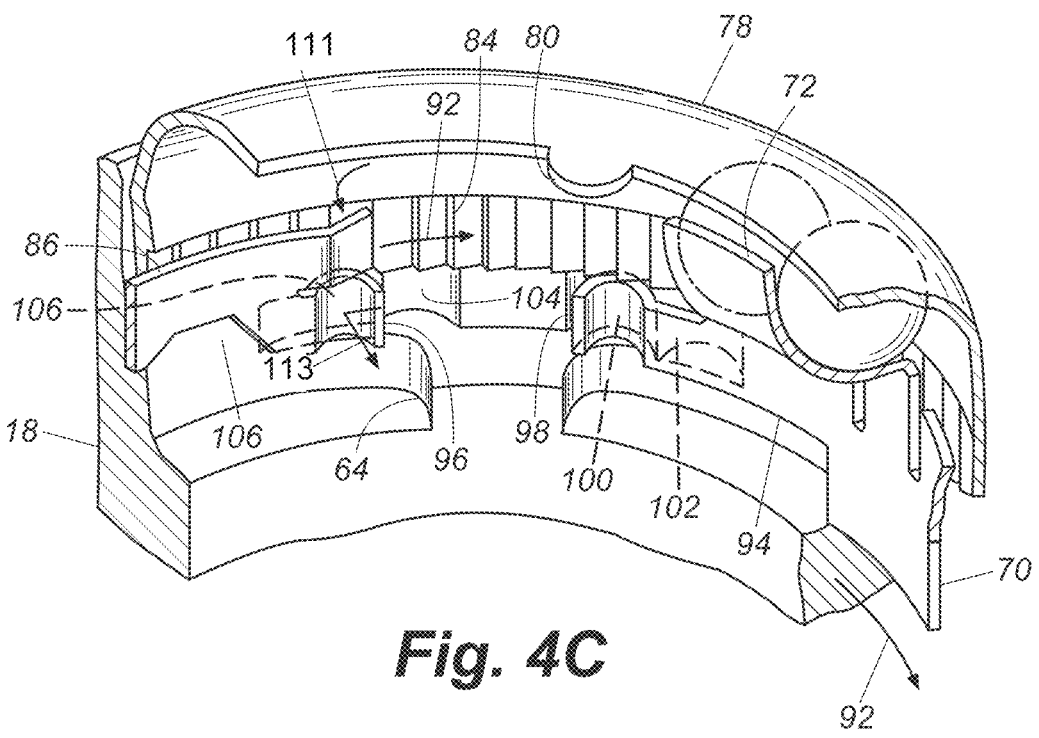
Figure 5:
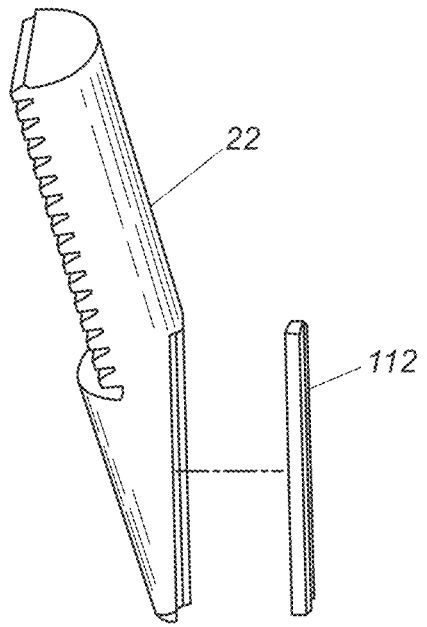
Figures 6A, 6B:
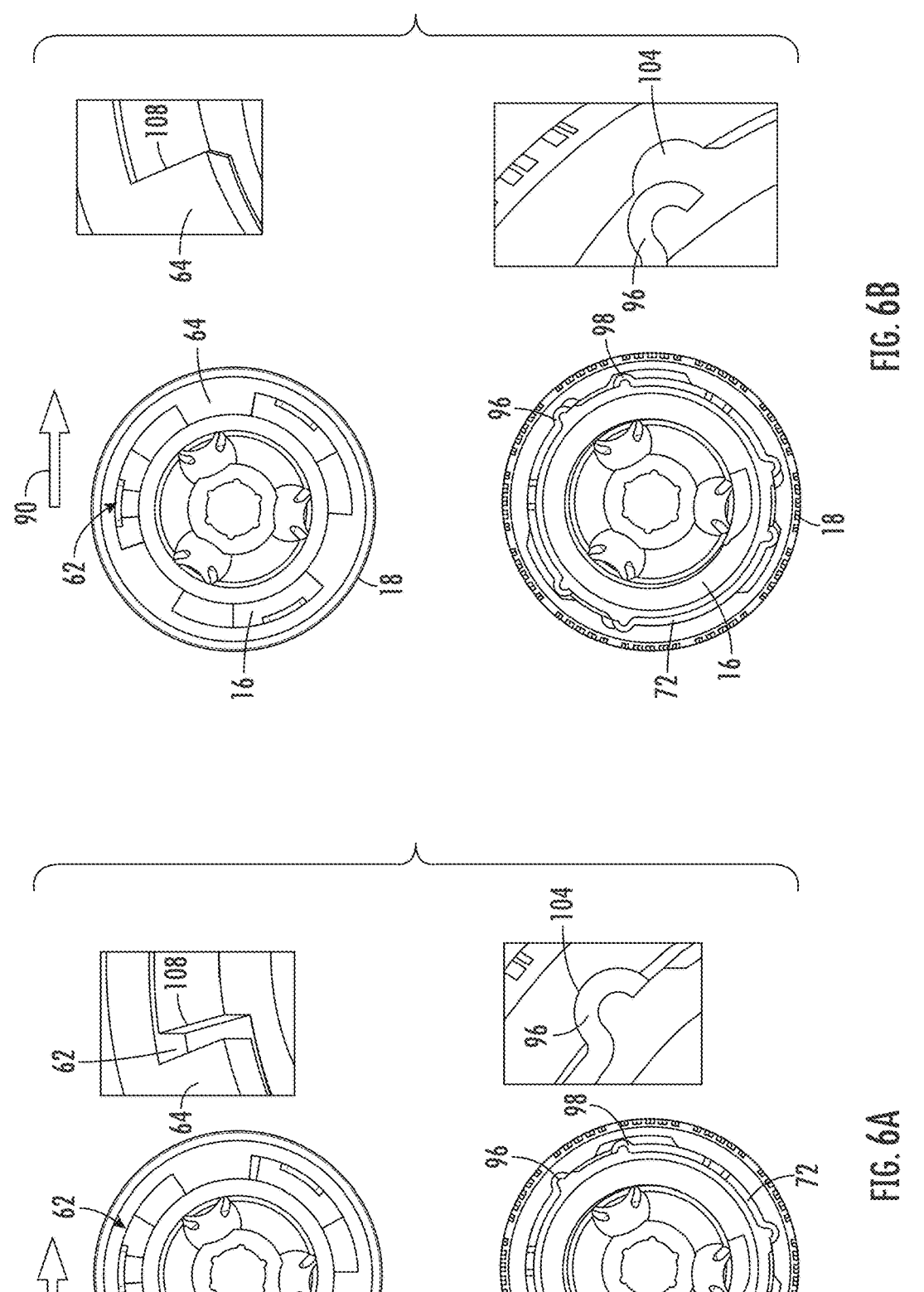
Figures 7A, 7B:
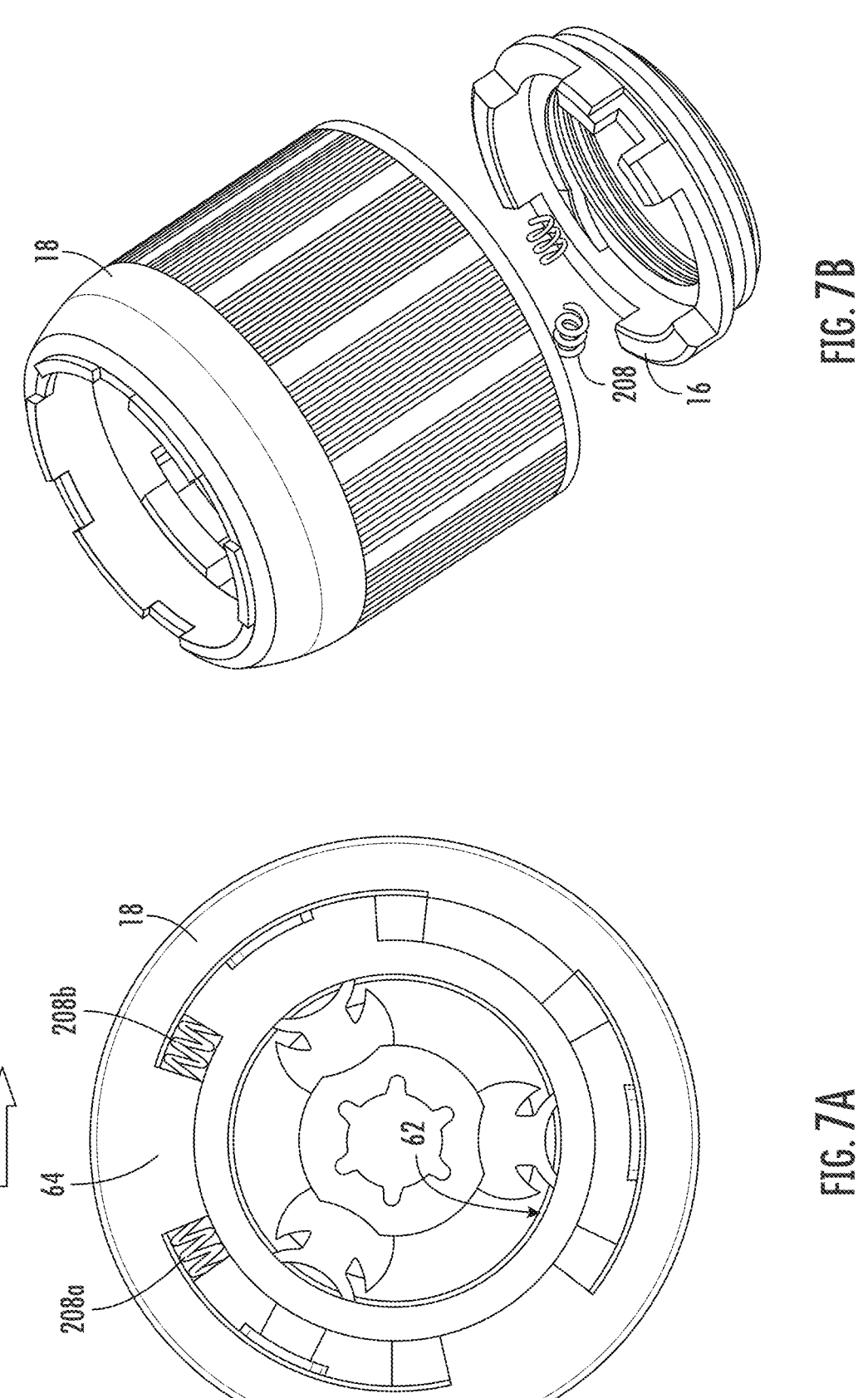

Having thus described the chuck in general terms, reference will now be made to the accompanying drawings, which are not necessarily drawn to scale, and wherein:

FIG. 1 illustrates a longitudinal view, partly in section, of a chuck in accordance with an example embodiment;

FIG. 2 illustrates an exploded view of a chuck as shown in FIG. 1 in accordance with an example embodiment;

FIG. 3 illustrates an exploded view of the bearing and nut of the chuck as shown in FIG. 1 in accordance with an example embodiment;

FIG. 4A illustrates a partial perspective view of the sleeve of the chuck as shown in FIG. 1 in accordance with an example embodiment;

FIG. 4B illustrates a partial perspective view of the bearing and sleeve of the chuck as shown in FIG. 1 in accordance with an example embodiment;

FIG. 4C illustrates a partial perspective view of the bearing and sleeve of the chuck as shown in FIG. 1 in accordance with an example embodiment;

FIG. 5 illustrates a perspective view of a chuck jaw of the chuck as shown in FIG. 1 in accordance with an example embodiment;

FIGS. 6A and 6B illustrate chuck slip protection in accordance with an example embodiment;

FIGS. 7A and 7B illustrate chuck slip protection in accordance with an example embodiment;

FIGS. 8A-8E illustrate chuck slip protection in accordance with an example embodiment; and FIGS. 9A-9G illustrate a chuck slip protection in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

Keyless chucks on power drivers and other rotating devices may "lock," e.g. may not be capable of opening by hand, in some applications. One example in which "locking" may occur may be drilling operations in a clutch mode, in which a clutch selectively applies force to the chuck to drive the tool. As the driver is used in a forward direction, the sleeve of the chuck may rotate with the chuck. When the clutch disengages the chuck may stop abruptly, and the inertial force of the sleeve may be transferred to a nut, which, in turn, tightens the jaws on the tool shank. Repeated operations in the clutch mode may cause incremental tightening, which may result in the "locking" of the chuck. Similarly, operation of the driver in a reverse direction may also cause the inertial force of the sleeve to be transferred to the nut, which, in turn, may loosen the jaws around the tool shank. Loosening of the jaws may cause the jaws to disengage the tool shank.

In an example embodiment, a biasing element may be provided between a portion of the sleeve and the nut to bias the sleeve toward a neutral position. A neutral position may be interpreted as a position in which the nut is not applying force in an opening direction or closing direction. The biasing element may limit or prevent the inertial force of the sleeve applied to the nut, to prevent "locking" or loosening of the nut. A gap may be provided between the sleeve and nut or a sleeve and a nut actuator, e.g. inner sleeve, to allow movement of the sleeve prior to engagement of the nut or nut actuator. In some instances the biasing element may be disposed in the gap, such that the biasing element absorbs the inertial force prior to the sleeve reaching an engagement position. The biasing element may be a spring, a flexible, e.g. rubber, cushion, a portion of an inner race of a bearing assembly, or the like.

Referring to FIGS. 1 and 2, a chuck 10 includes a body 14, a nut 16, a front sleeve 18, a nose piece 20 and a plurality of jaws 22. Body 14 may be generally cylindrical in shape and may be formed from metal such as steel, aluminum, or other suitably durable material. Body 14 may include a nose or forward section 24 and a tail or rearward section 26. Nose section 24 may include a front face 28 transverse to the longitudinal center axis 30 of body 14 and a tapered surface 32 at its forward end. The nose section 24 may define an axial bore 34 that may be dimensioned somewhat for example larger than the largest tool shank that the tool may be designed to accommodate. A threaded bore 36 may be formed in tail section 26 and may be of a size to mate with the drive shaft of a powered or hand driver. The bores 34, 36 may engage at a central region 38 of body 14. While a threaded bore 36 is illustrated, such bore could be replaced with a tapered bore of a size to mate with a tapered drive shaft. According to some example embodiments, body 14 may not include a bore and may be formed integrally with the drive shaft.

Body 14 may define three passageways 40 to accommodate three jaws 22. Each jaw may be separated from the adjacent jaw by an angle of approximately 120 degrees. In some example embodiments, the axes of passageways 40 and jaws 22 may be angled with respect to the chuck 10 center axis 30 such that each passageway axis travels through axial bore 34 and intersects axis 30 at a common point ahead of the body 14. The jaws 22 may form a grip that moves radially toward and away from the center axis 30 to grip a tool, and each jaw 22 may have a tool engaging face 42 generally parallel to the axis 30. Threads 44, formed on the opposite or outer surface of jaws 22, may be constructed in any suitable type and pitch. As shown in FIG. 5, each jaw 22 may be formed with carbide inserts 112 pressed into its tool-engaging surface.

As illustrated in FIGS. 1 and 2, body 14 may include a thrust ring 46 that may be integral with the body 14. It should be understood, however, that thrust ring 46 and body 14 may be separate components. Thrust ring 46 may include a plurality of jaw guideways 48 formed around its circumference to permit retraction of jaws 22 therethrough. Thrust ring 46 may also include a ledge portion 50 to receive a bearing assembly, as described below.

Body tail section 26 may include a knurled surface 54 that receives an optional rear sleeve 12 in a press fit at 55. Rear sleeve 12 may also be retained by press fit without knurling, by use of a key or by crimping, staking, riveting, threading or any other suitable securing mechanism. Further, the chuck 10 may be constructed with a single sleeve having no rear sleeve 12.

Nose piece 20 may retain nut 16 against forward axial movement. The nose piece 20 may be press fit to body nose section 24. It should be understood, however, that other methods of axially securing the nut 16 on the body 14 may be used. For example, the nut 16 may be a two-piece nut held on the body 14 within a circumferential groove on the outer circumference of the body 14. Nose piece 20 may be coated with a non-ferrous metallic coating to prevent rust and to enhance its appearance. Examples of suitable coatings include, without limitation, zinc or nickel, although it should be appreciated that any suitable coating could be utilized.

The outer circumferential surface of front sleeve 18 may be knurled or may be provided with longitudinal ribs 77 or other protrusions to enable the operator to grip it securely. In like manner, the circumferential surface of rear sleeve 12, if employed, may be knurled or ribbed as at 79 if desired.

Front sleeve 18 may be secured from movement in the forward axial direction by an annular shoulder 91 on nose piece 20. A frustoconical section 95 at the rearward end of the nose piece facilitates movement of jaws 22 within the chuck 10.

The front sleeve 18 and/or rear sleeve 12 may be molded or otherwise fabricated from a structural plastic such as polycarbonate, a filled polypropylene, for example a glass filled polypropylene, or a blend of structural plastic materials. Other composite materials such as, for example, graphite filled polymerics may also be suitable in certain environments. As should be appreciated by one skilled in the art, the materials from which the chuck 10 may be fabricated may depend on the end use of the chuck 10, and the above materials are provided by way of example only.

Nut 16 has threads 56 for mating with jaw threads 44. Nut 16 may be positioned about the body 14 in engagement with the jaw threads 44 so that when the nut 16 may be rotated with respect to body 14, the jaws 22 will be advanced or retracted depending on the rotational direction of the nut 16.

As illustrated in FIG. 3, the forward axial face of the nut 16 includes nut grooves 62 that receive respective drive dogs 64 (FIG. 2) extending from the inner surface of front sleeve 18. The angular width of the drive dogs 64 may be less than that of the nut grooves 62, resulting in a slight range of relative rotational movement, for example between 4 degrees and 30 degrees, between the nut and the front sleeve 18.

Nut 16 may also define a plurality of grooves formed as flats 68 about the outer circumference of nut 16. Flats 68 may receive respective tabs 70 extending forward from an inner race 72 of a bearing assembly 74. The engagement of tabs 70 and flats 68 may rotationally fix the inner race to the nut 16, although it should be understood that there may be a slight rotational tolerance between the tabs 70 and flats 68.

Inner race 72 may receive a plurality of bearing elements, in this example bearing balls 76, disposed between the inner race 72 and an outer race 78 seated on thrust ring ledge 50 (FIG. 1). Outer race 78 may be rotationally fixed to body 14 by a plurality of tabs 80 received in corresponding grooves 82 in the thrust ring ledge.

Outer race 78 may also include a ratchet. In the illustrated embodiment, the ratchet may be formed by a plurality of sawtooth-shaped teeth 84 disposed about the inner circumferential surface of the outer race 78. A first pawl 86 may extend from one side of each tab 70 and may be biased radially outward from the inner race 72, thereby urging a distal end 88 of each pawl 86 toward the outer race ratchet.

Each tooth 84 has a first side with a slope approaching 90 degrees. The second side of each tooth 84 may have a lesser slope. Pawl 86 may be deflectable and may be generally disposed in alignment with the slope of the second side. Thus, rotation of inner race 72 in a closing direction 90 with respect to outer race 78 may move pawl distal ends 88 repeatedly over teeth 84, causing a clicking sound, as ends 88 fall against each subsequent tooth's second side. This configuration of teeth 84 and pawl 86, however, may prevent the rotation of the inner race 72 in an opening direction 92. Application of rotational force to the inner race 72 in the opening direction 92 forces distal ends 88 into the steep-sloped first sides of teeth 84. Since pawl 86 may be generally perpendicular to the first sides, pawl 86 does not deflect inward to permit rotation.

As discussed below, closing direction 90 corresponds to the tightening of jaws 22, while opening direction 92 corresponds to loosening of the jaws 22. Accordingly, when pawls 86 engage ratchet teeth 84, the teeth may permit the movement of the inner race 72 in the opening direction 92, but prevent the movement of the inner race 72 in the closing direction 90.

A second deflectable pawl 94 may extend to the other side of each tab 70. Like pawls 86, each pawl 94 may be biased radially outward. Unlike pawls 86, however, pawls 94 may not engage the outer race ratchet.

Pawls 86 and 94 may include tabs 96 and 98 at their distal ends. Referring also to FIG. 4A, an inner circumferential surface of front sleeve 18 may define first and second recesses 100 and 102. During the operation, each tab 98 may be received in one of these recesses 100,102, depending on the rotational position of the front sleeve 18 with respect to the nut 16, as discussed in more detail below. The front sleeve 18 may also define a third recess 104 and a cam surface 106. Also depending on the rotational position of the front sleeve, each tab 96 may be received either by the cam surface or by recess 104. The front sleeve 18 may include the pair of recesses 100, 102 for each tab 98 and a recess 104 and cam surface 106 for each tab 96.

FIG. 4C illustrates the disposition of pawls 86 and 94 when front sleeve 18 may be in a first of two positions with respect to nut 16 (FIG. 2), while FIG. 4B illustrates these components when the front sleeve 18 is in a second position with respect to the nut 16. For ease of illustration, both FIGS. 4B and 4C omit the nut 16. However, referring to FIG. 2 and to the second position of the front sleeve 18, as shown in FIG. 4B, each drive dog 64 may be disposed against or adjacent to a first engagement edge 108 of the nut groove 62 in which each drive dog 64 may be received. Each of the recesses 102 of front sleeve 18 may receive tab 98 of one of the pawls 94, and each recess 104 receives tab 96 of one of the pawls 86. Accordingly, the distal end 88 of each pawl 86 may engage ratchet teeth 84, and inner race 72 may rotate only in the opening direction 92 with respect to outer race 78.

Referring now to FIG. 4C, when inner race 72 moves in the opening direction 92 with respect to the outer race 78, each tab 98 moves out of recess 102 and into recess 100, as indicated by arrow 111. Each tab 96 rides up and out of its recess 104 onto its cam surface 106, as indicated by arrow 113. As indicated by arrow 112, the tabs 96 riding up and out of recesses 104 may push each deflectable tab 86 radially inward, thereby disengaging distal ends 88 from ratchet teeth 84. Thus, the inner race 72 may be free to rotate with respect to the outer race 78.

As described in more detail below, when front sleeve 18 rotates in the opening direction 92 so that the inner race 72 moves from the position shown in FIG. 4B to the position shown in FIG. 4C, drive dogs 64 may move within nut grooves 62 of nut 16 (FIG. 2) so that each drive dog 64 may be against or immediately adjacent to a second engagement edge 110 of the nut groove 62.

In operation, and referring to FIGS. 2, 3, 4B and 4C, nut grooves 62 receive drive dogs 64 when the chuck 10 may be between fully opened and fully closed positions so that the drive dogs 64 are adjacent the first engagement edges 108. Inner race 72 may be disposed with respect to outer race 78 so that tabs 96 and 98 are received by cam surface 106 and recess 100, respectively. Front sleeve 18 may be in the first position with respect to the nut 16. In this condition, tabs 98 and recesses 100 rotationally fix inner race 72 to front sleeve 18. Since inner race 72 may be rotationally fixed to nut 16 by tabs 70 and flats 68, an operator rotating front sleeve 18 rotationally drives the nut through inner race 72, thereby opening or closing the jaws 22. When the operator rotates the front sleeve 18 in the closing direction 92 to the point that the jaws 22 tighten onto a tool shank, the nut 16 may be urged rearward up the jaw threads 44, thereby pushing the nut against inner race 72, bearing elements 76, outer race 78 and thrust ring 46. The rearward force creates a frictional lock between the nut 16 and inner race 72 that further rotationally fixes the nut 16 and inner race 72.

The wedge between the nut threads 56 and jaw threads 44 increasingly resists the rotation of nut 16. When the operator continues to rotate front sleeve 18, and the resistance overcomes the hold provided by tabs 98 in recesses 100, front sleeve 18 rotates with respect to nut 16 and inner race 72. This moves drive dogs 64 from second engagement edge 110 to the first engagement edge 108 of nut grooves 62 and pushes tabs 98 out of recesses 100 into recesses 102. Simultaneously, cam surfaces 106 rotate away from tabs 96 so that the tabs 96 are released into recesses 104, thereby engaging distal ends 88 of pawls 86 with ratchet teeth 84, as shown in FIG. 4B. At this point, inner race 72, and therefore nut 16, may be rotationally locked to outer race 78 and body 14, against rotation in the opening direction 92. In other words, the nut 16 may be rotationally locked to the body 14 in the opening direction 92. Since the rotation of the nut 16 with respect to the body 14 may be necessary to open the jaws 22 of the chuck 10, the rotational locking of the nut 16 may prevent inadvertent opening during use.

Inner race 72, and therefore nut 16, may, however, still rotate with respect to outer race 78, and therefore body 14, in the closing direction 90. During rotation in the closing direction 90, front sleeve 18 may drive nut 16 through drive dogs 64 against first engagement edge 108, as well as through inner race 72. Further rotation of the front sleeve 18 in the closing direction 92 may continue to tighten the chuck 10 and, as described above, may produce a clicking sound to notify the operator that the chuck 10 is in a fully tightened position.

To open the chuck 10, the operator may rotate front sleeve 18 in the opening direction. Front sleeve 18 transfers torque to inner race 72 at the engagement of tabs 96 and 98 in recesses 104 and 102, respectively. Because pawls 86 engage outer race 78, which may be rotationally fixed to the body, through the ratchet teeth, the inner race 72 may not rotate with the front sleeve 18. Thus, upon application of sufficient torque in the opening direction 92, front sleeve 18 moves with respect to the inner race 72 and the nut 16. Rotating the front sleeve 18 in the opening direction 92 may move tabs 96 back up onto cam surfaces 106, thereby disengaging pawls 86 from ratchet teeth 84. Tabs 98 may move from recesses 102 into recesses 100, and drive dogs 64 move from the first engagement edges 108 to the second engagement edges 110 of the nut grooves 62. Thus, the front sleeve 18 may move to its first position with respect to the nut 16, as shown in FIG. 4C, and the inner race 72 and nut 16, are free to rotate with respect to the outer race 78 and body 14. Accordingly, further rotation of front sleeve 18 in the opening direction 92 may move jaws 22 away from the enter axis 30, thereby opening the chuck 10.

It should be understood that the embodiments illustrated in FIGS. 1-5 are provided by way of explanation only and that the chuck 10 may be realized in any suitable form. For example, the pawls and ratchet may be formed in any suitable configuration. In an example embodiment, a chuck 10 may include a body, a nut that may be rotationally fixed to and axially movable with respect to the body, and an outer sleeve that threadedly engages the nut so that rotation of the sleeve moves the nut axially on the body. The jaws may be axially fixed to the nut and received in body passageways so that the axial movement of the nut drives the jaws toward and away from the center axis. In this configuration, the outer sleeve may be permitted to rotate over a limited angular distance with respect to a second, inner, sleeve. A bearing including a ratchet configuration, as discussed above, may be disposed between the inner sleeve and the body 14. Still further, depending on the chuck configuration, the pawls and ratchet may be interchanged as appropriate.

FIGS. 7A-10G illustrate chuck 10 slip protection in accordance with example embodiments. A biasing element may be provided between a portion of the front sleeve 18 and the nut 16 to bias the front sleeve 18 to a neutral position. The biasing element may be configured to prevent or limit the inertial force transferred by the front sleeve 18 to the nut 16 during operation of the power driver.

In the embodiment depicted in FIGS. 6A and 6B, a gap may be provided between a driving edge of a driving dog 64 and the first engagement edge 108 of the nut groove 62, when the front sleeve 18 is in the neutral position. In an example embodiment the gap may be 3 degrees, 4 degrees, 10 degrees, 15 degrees or the like. The depicted embodiment includes a gap of approximately 4 degrees. In an instance in which the front sleeve 18 is turned in the closing direction 90 by manual operation or by inertia, the drive dog 64 may move from the neutral position to an engaged position, in which the driving edge of the drive dog 64 is in contact with the first engagement edge 108 of the nut groove 62. In the engaged position rotational force applied to the front sleeve 18 may be transferred to the nut 16 to cause the jaws 22 to close, as discussed above.

In the embodiment depicted in FIGS. 6A and 6B, the biasing element is a portion of the inner race 72. As discussed above the inner race 72 include a tab 96 configured to be received by the recess 104 in the front sleeve 18. As the front sleeve moves in the closing direction 90 the tab 96 is forced up and out of recess 104, causing a spring force of the inner race 72 to be applied in the opposite direction. In an instance in which the force applied by to the front sleeve 18 in the closing direction is inertia force, the spring force may counter and in some instances overcome the inertial force, driving the tab 96 down and into the recess 104. The spring force may slow or prevent the driving edge of the drive dog 64 from engaging the first engagement edge 108 of the nut groove 62, thus limiting or preventing the inertia force from being transferred to the nut 16 tightening the jaws 44. In an instance in which the force applied by the front sleeve 18 is manual force, such as an operator hand tightening the chuck 10, the manual force may overcome the spring force, allowing the driving edge of the drive dog 64 to engage the first engagement edge 108 of the recess 62, thus transferring the manual force to the nut 16 tightening the jaws 22. Similarly, tab 98 and recess 100 or recess 102 may limit or prevent a transfer of inertial force from the front sleeve 18 to the nut in the opening direction 90.

Turning to the example depicted in FIGS. 7A and 7B, the biasing element 208 may be disposed between the driving edge of the drive dog 64 and the first engagement edge 108 of the nut groove 62. The biasing element 208 may be a resilient or elastic material, such as a spring, e.g. a coil spring, a wave spring, or the like; a flexible cushion, e.g. rubber cushion, or the like. In some embodiments, a plurality of biasing elements 208 may be provided, for example a first biasing element 208a may be disposed between a first driving edge, e.g. a closing direction driving edge, of a driving dog 64 and the first engagement edge 108 of a first nut groove 62 and a second biasing element 208b may be disposed between a second driving edge, e.g. a opening direction driving edge, of the driving dog 64 and a second engagement edge 110 of a second nut groove 62.

In an instance in which the front sleeve 18 is rotated in the closing direction 90, by manual force or inertia force, the driving edge of the drive dog 64 may move toward the first engagement edge 108 of the nut groove 62, compressing the biasing element 208a generating a first spring force. In some embodiments the biasing element 208 may be fixed, such as by adhesive, welding, or the like to the driving edge of the drive dog and the engagement edge 108, 110 of the groove nut 62, such that movement of the front sleeve 18 may also cause an stretching of the biasing element 208b fixed to the second driving edge of the drive dog opposite the first driving edge of the drive dog 64. The stretching of the second biasing element 208b may generate a second spring force in addition to the first spring force. The spring force may slow or prevent the driving edge of the drive dog 64 from engaging the first engagement edge 108 of the nut groove 62, thus limiting or preventing the inertia force from being transferred to the nut 16 tightening the jaws 22. Engagement of the driving edge of the driving dog 64 with the first engagement edge 108 of the nut groove 62 may include full compression of the biasing element 208 between the driving edge and the first engagement edge 108. In an instance in which the force applied by the front sleeve 18 is manual force, such as an operator hand tightening the chuck 10, the manual force may overcome the spring force, allowing the driving edge of the drive dog 64 to engage the engagement edge 108 of the nut groove 62, thus transferring the manual force to the nut 16 tightening the jaws 22. Similarly, biasing elements 208b and/or biasing element 208a may limit or prevent a transfer of inertial force from the front sleeve 18 to the nut 16 in the opening direction 92.

The front sleeve 18 depicted in FIGS. 8A-8D includes an inner sleeve 18a, e.g. a nut actuator, configured to transfer rotational force applied to the front sleeve 18 to the nut 16. The biasing element 204 may be disposed between the front sleeve 18, e.g. outer sleeve, and the inner sleeve 18a. The inner sleeve 18a may include one or more protrusions 200 and the sleeve may include one or more drive tabs 202. A driving edge of the drive tabs 202 may be configured to engage an engagement edge of the protrusions 200 to transfer the rotational force applied to the front sleeve 18 to the inner sleeve 18a, and in turn to the nut 16. A biasing element 204 may be disposed in a gap 206 between the driving edge of the tab 202 and the engagement edge of the protrusion 200. The biasing element 204 may be a resilient or elastic material, such as a spring, e.g. a coil spring, a wave spring, or the like; a flexible cushion, e.g. rubber cushion, or the like. In some embodiments, a plurality of biasing elements 204 may be provided, for example a first biasing element 204a disposed in a first gap 206a between a first driving edge, e.g. the closing direction driving edge, of a driving tab 202 and a first engagement edge of a first protrusion 200 and a second biasing element 204b disposed in a gap 206b between a second driving edge, e.g. the opening direction driving edge, the driving tab 202 and a first engagement edge of a second protrusion 200.

Figures 8A, 8B:
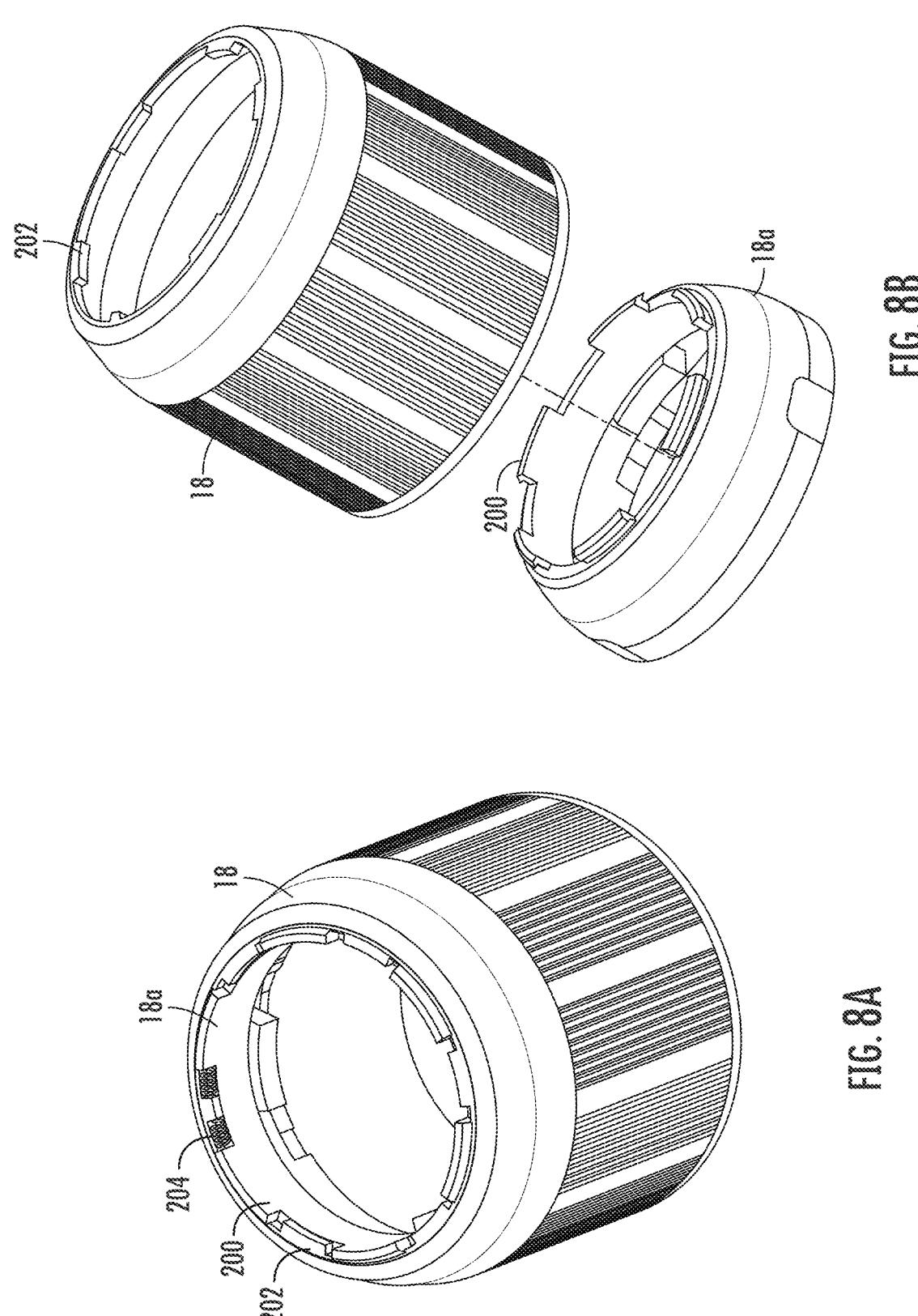
Figure 8C:
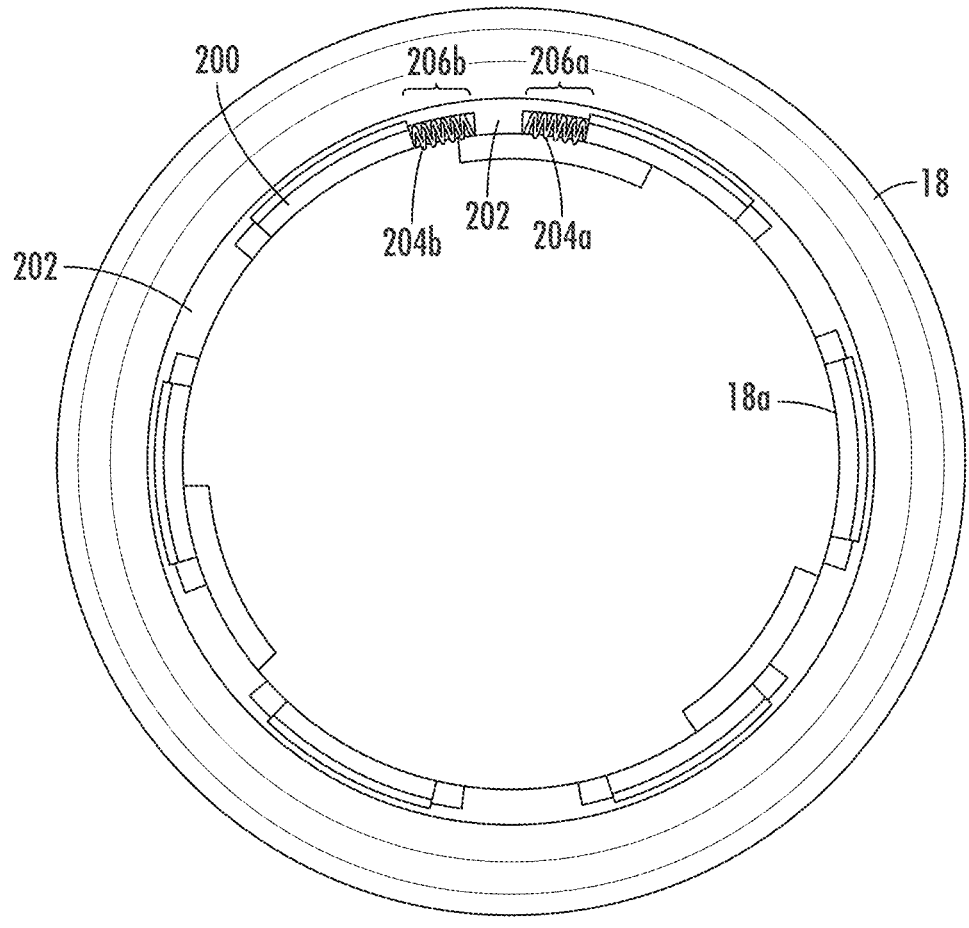
Figures 8D, 8E:
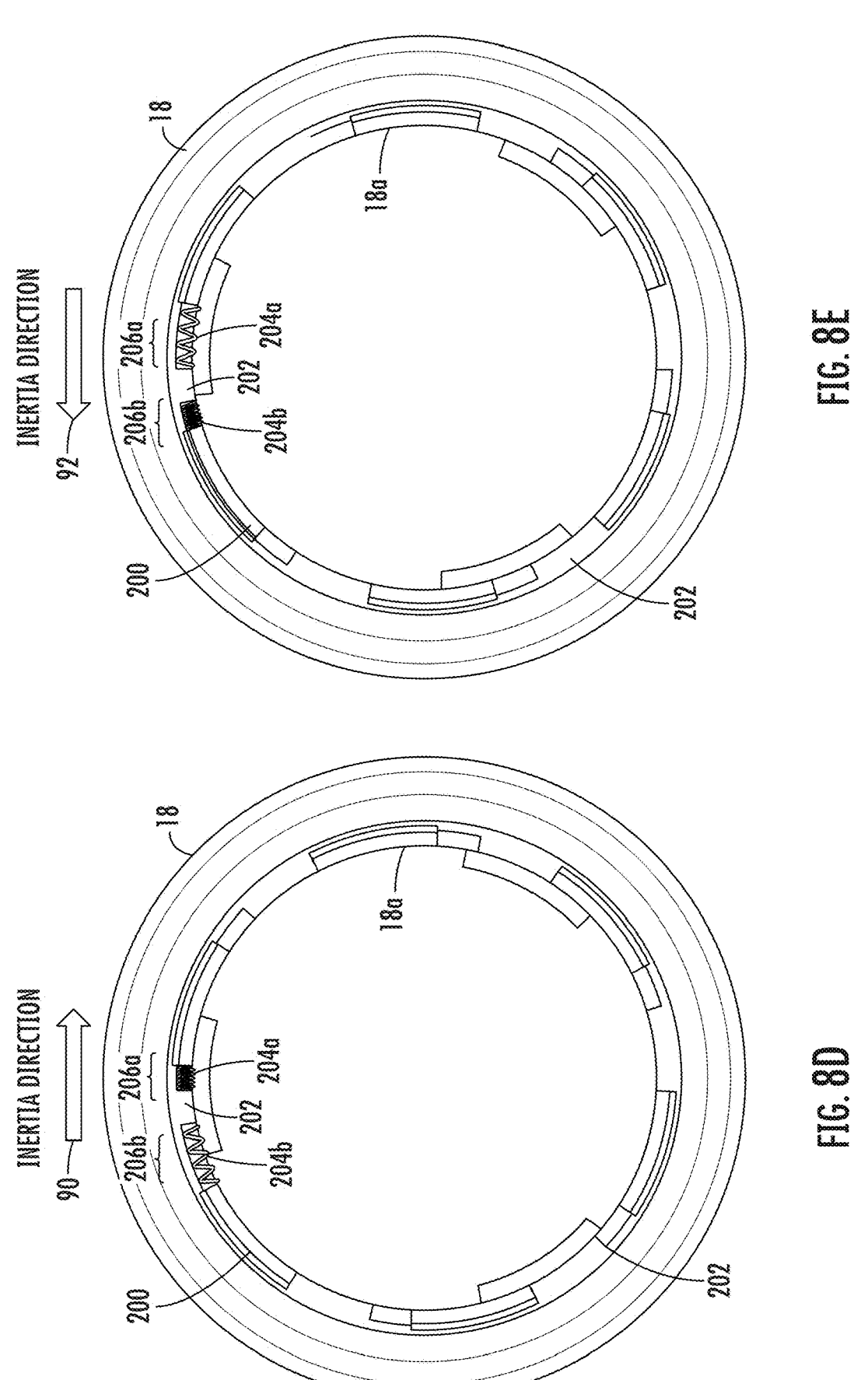

In an instance in which the front sleeve 18 is rotated in the closing direction 90, as depicted in FIG. 8D, by manual force or inertia force, the driving edge of the drive tab 202 may move toward the engagement edge of the protrusion 200, compressing the biasing element 204a to generate a first spring force. In some embodiments, the biasing element 204 may be fixed, such as by adhesive, welding, or the like to the driving edge of the drive tab 202 and the engagement edge of the protrusion 200, such that movement of the front sleeve 18 may also cause stretching of the biasing element 204b fixed to the second driving edge of the drive tab 202 opposite the first driving edge of the drive tab 202. The stretching of the second biasing element 208b may generate a second spring force in addition to the first spring force. The spring force may slow or prevent the driving edge of the drive tab 202 from engaging the engagement edge of the protrusion 200, thus limiting or preventing the inertia force from being transferred to the nut 16 tightening the jaws 22. Engagement of the driving edge of the driving tab 202 with the engagement edge of the protrusion 200 may include full compression of the biasing element 204a between the driving edge and the engagement edge. In an instance in which the force applied by the front sleeve 18 is manual force, such as an operator hand tightening the chuck 10, the manual force may overcome the spring force, allowing the driving edge of the drive tab 202 to engage the engaging edge of the protrusion 200, thus transferring the manual force to the inner sleeve 18a, which, in turn, transfers the rotational force to the nut 16 tightening the jaws 22. Similarly, biasing elements 204b and/or biasing element 204a may limit or prevent a transfer of inertial force from the front sleeve 18 to the inner sleeve 18a in the opening direction as depicted in FIG. 8E.

FIGS. 9A-9G depict an example embodiment of a front sleeve 18 including an inner sleeve 18a, e.g. a nut actuator, and a biasing element 210. The front sleeve 18 may include one or more drive tabs 212 and the inner sleeve 18a may include one or more protrusions 214. A driving edge of the drive tabs 212 may be configured to engage an engagement edge 213 of the protrusions 214 to transfer the rotational force applied to the front sleeve 18 to the inner sleeve 18a, and in turn to the nut 16. The biasing element 210 may be a torsion spring including pawls 211 at each end configured to engage, e.g. be disposed on, a non-driving edge of the drive tab 212 and a non-driving edge of the protrusion 214. The biasing element 210 may encompass at least 180 degrees of an inner parameter, such as a parameter defined by the protrusions 214, of the inner sleeve 18a. In an example embodiment, the biasing element 210 may encompass 180 degrees, 270 degrees, 405 degrees, or the like. In some example embodiments, the biasing element may encompass less than 180 degrees such as 60 degrees 90 degrees or the like. Additionally or alternatively, the chuck 10 may include a plurality of biasing elements 210, such as one per protrusion 200, one biasing element every other protrusion 200, or the like.

Figure 9B:
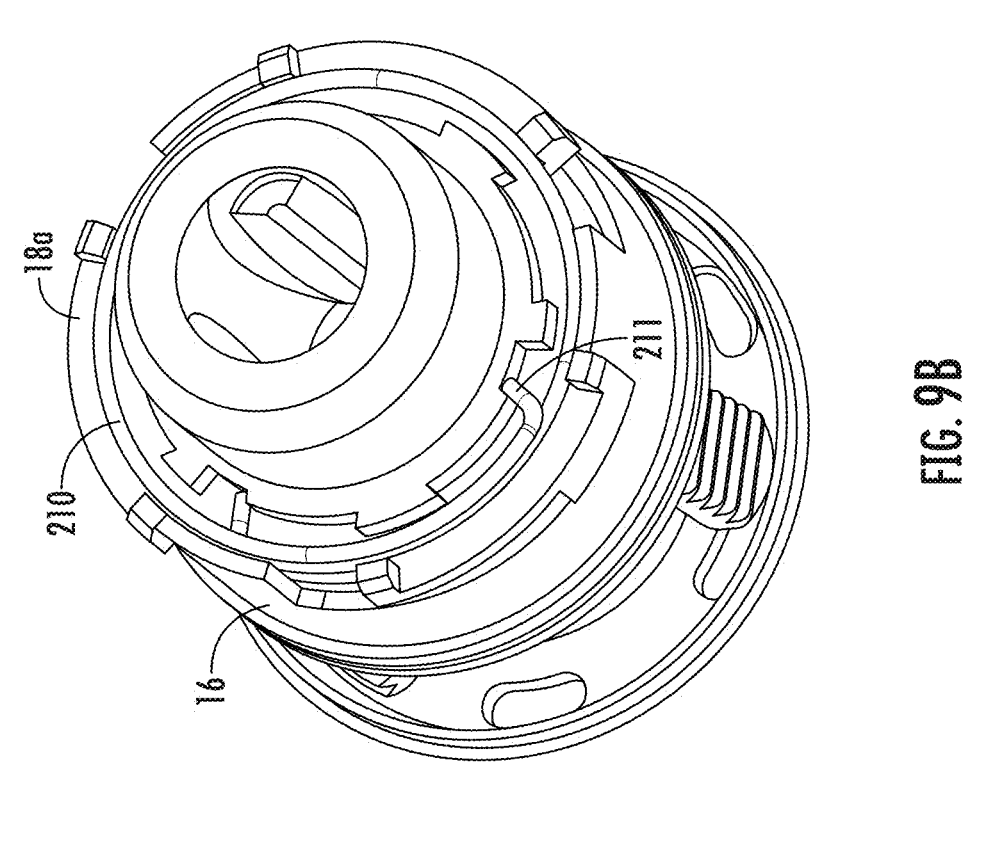
Figure 9A:
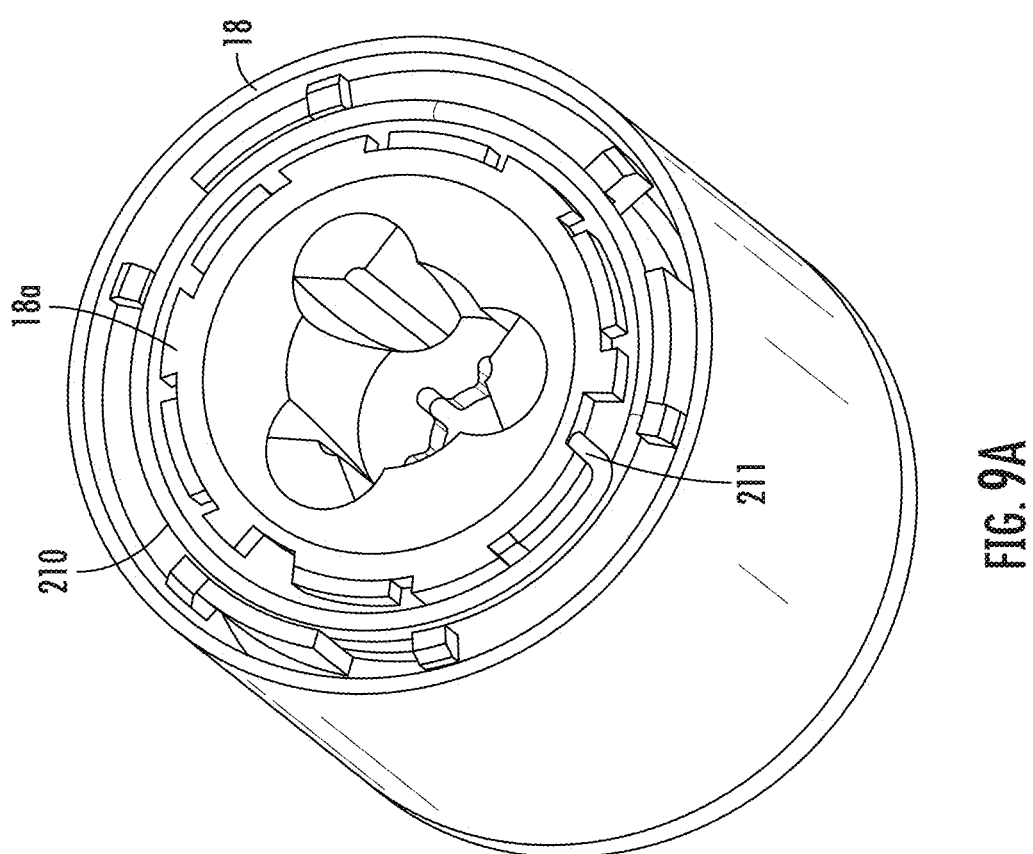
Figure 9C:
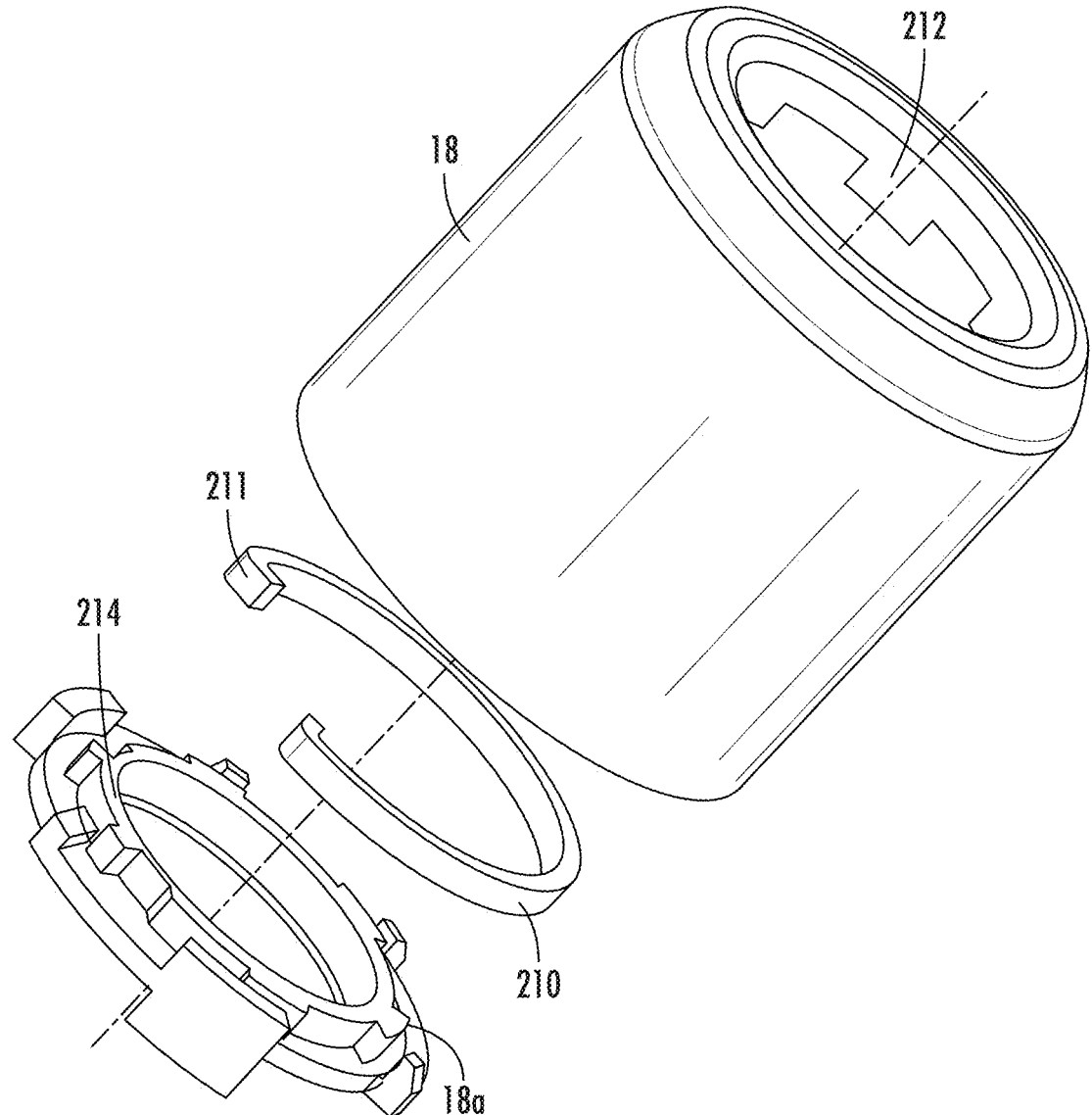
Figure 9D:
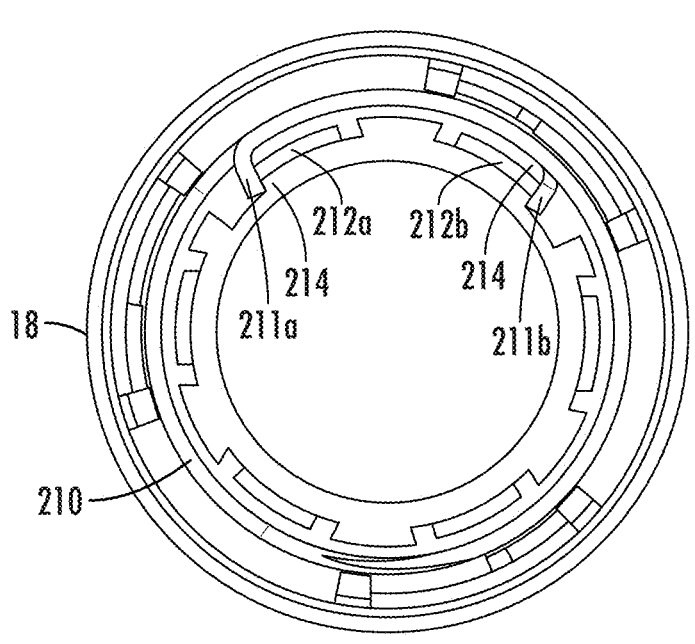
Figure 9E:
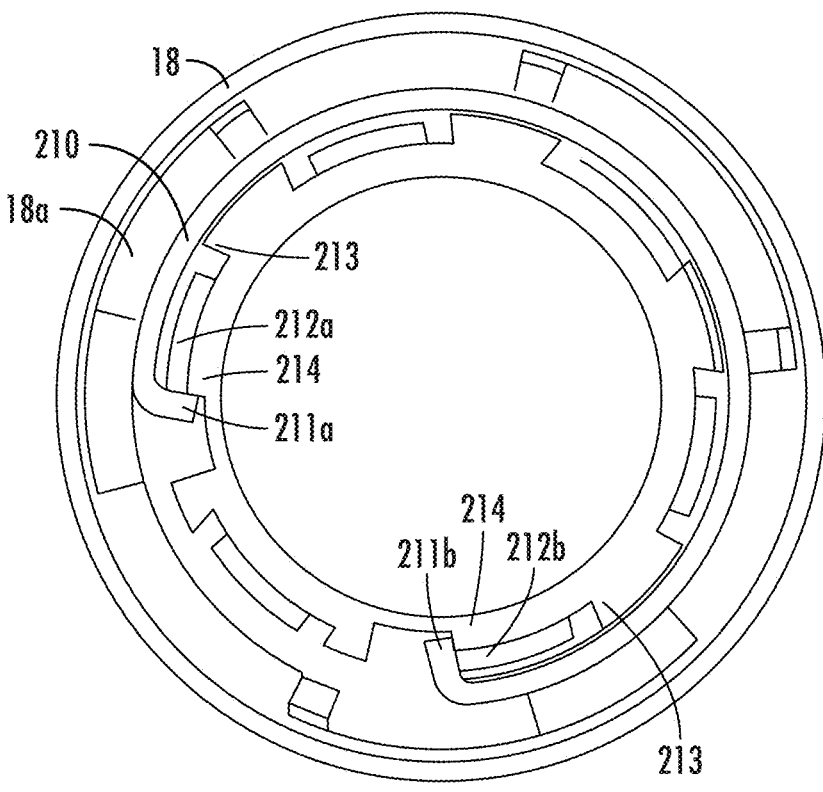
Figures 9F, 9G:
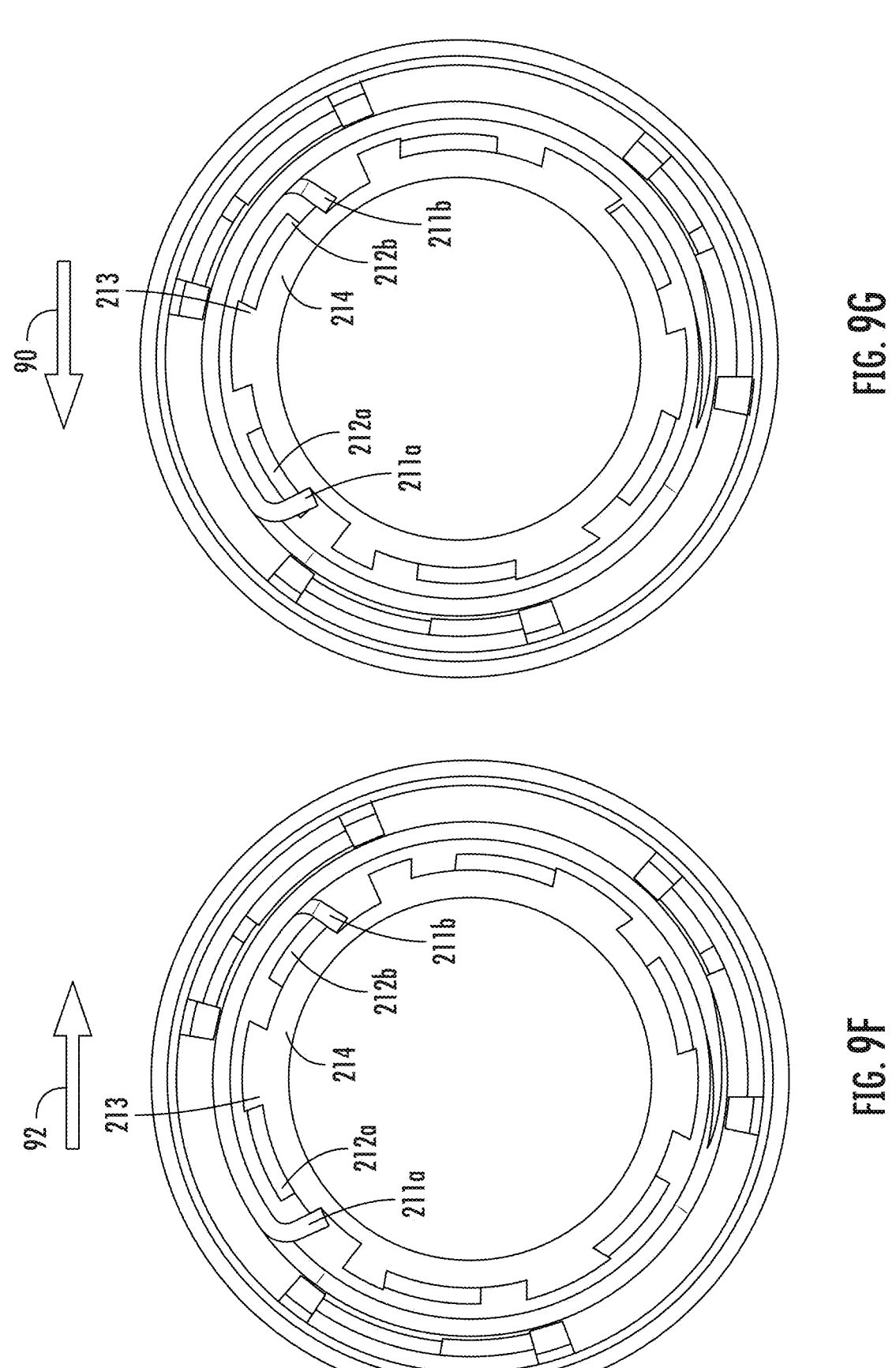

In an instance in which the front sleeve 18 is rotated in the closing direction 90, as depicted in FIG. 9F, by manual force or inertia force, the driving edge of the drive tab 212b may move toward the engagement edge 213 of the protrusion 214, the non-driving edge of driving tab 212a may apply force to the first pawl 211a, while a second pawl 211b is maintained in position by the non-driving edge of the protrusion 214. The movement of the first pawl 211a may cause tightening of the biasing element 210 generating a spring force. The spring force may slow or prevent the driving edge of the drive tab 212b from engaging the engagement edge 213 of the protrusion 200, thus limiting or preventing the inertia force from being transferred to the nut 16 and tightening the jaws 22. In an instance in which the force applied by the front sleeve 18 is manual force, such as an operator hand tightening the chuck 10, the manual force may overcome the spring force, allowing the driving edge of the drive tab 212b to engage the engagement edge 213 of the protrusion 214, thus transferring the manual force to the inner sleeve 18a, which, in turn, transfers the rotational force to the nut 16 tightening the jaws 22. Similarly, the biasing element 210 may limit or prevent a transfer of inertial force from the front sleeve 18 to the inner sleeve 18a in the opening direction 92, as depicted in FIG. 9G.

In some example embodiments, the chuck may be further configured for optional modifications. In this regard, for example, the sleeve includes a drive dog configured to engage a nut groove in the nut. A gap is provided between at least one driving edge of the drive dog and an engagement edge of the nut groove. In an example embodiment, the gap is provided between a first driving edge of the driving dog and a first engagement edge of the nut groove and between a second driving edge of the driving dog and a second engagement edge of the nut groove. In some example embodiments, the biasing element is disposed in the gap between the at least one driving edge of the driving dog and the engagement edge of the nut groove. In an example embodiment, the biasing element includes an inner race of a bearing assembly. The inner race comprises a tab configured to be received by a recess disposed in the sleeve, such that rotation of the sleeve causes a wall of the recess to press against the tab. In some example embodiments, the biasing element includes a spring. In an example embodiment, the spring includes a wave spring. In some example embodiments, the spring includes a coil spring. In an example embodiment, the biasing element includes a resilient cushion. In some example embodiments, the biasing resilient cushion includes a rubber cushion. In an example embodiment, the sleeve includes an inner sleeve and an outer sleeve. The inner sleeve is configured to transfer rotational force applied to the outer sleeve to the nut, and wherein the biasing element is disposed between the outer sleeve and the inner sleeve. In some example embodiments, the outer sleeve includes one or more drive tabs and the inner sleeve comprises one or more protrusions wherein a gap is provided between a first edge of at least one of the one or more drive tabs and a first edge of at least one protrusion. In an example embodiment, a gap is provided between the first edge of at least one of the one or more drive tabs and a first edge of a first protrusion and between a second edge of the at least one of the one or more drive tabs and a first edge of a second protrusion. In some example embodiments, the biasing element is disposed in the gap. In an example embodiment, the biasing element includes a torsion spring configured to encompasses at least 180 degrees of an inner perimeter of the inner sleeve, the torsion spring includes a first pawl and a second pawl, wherein the first pawl is disposed on a non-driving edge of a first drive tab and a non-driving edge of a first protrusion and the second pawl is disposed on a non-driving edge of a second drive tab and a non-driving edge of a second protrusion, such that movement of a first drive tab toward the drive edge of the first protrusions or movement of a second drive tab toward the drive edge of the second protrusions causes the an increase in tension of the tension spring. In some example embodiments, the torsion spring encompasses 270 degrees of an inner perimeter of the inner sleeve. In an example embodiment, the torsion spring encompasses 405 degrees of the inner perimeter of the inner sleeve.

Many modifications and other embodiments of the chuck set forth herein will come to mind to one skilled in the art to which these inventions pertain having the benefit of the teachings presented in the foregoing descriptions and the associated drawings. Therefore, it is to be understood that the chucks are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A chuck for use with a powered driver having a rotatable drive shaft, the chuck comprising:
   a body comprising a nose section and a tail section, the tail section being configured to rotate with the rotatable drive shaft and the nose section comprising an axial bore, the body further comprising a plurality of passageways that intersect with the axial bore;
   a plurality of jaws movably disposed in the plurality of passageways;
   a nut rotatably mounted about the body and in operative communication with the plurality of jaws such that rotation of the nut in a closing direction moves each jaw in the plurality of jaws toward an axis of the axial bore to tighten the plurality of jaws and rotation of the nut in an opening direction moves each jaw of the plurality of jaws away from the axis of the axial bore to loosen the plurality of jaws;
   a sleeve rotatably mounted about the body, wherein the sleeve is in operative communication with a drive dog configured to engage with an engagement edge of the nut during manual rotation of the sleeve to cause rotation of the nut; and
   a biasing element configured to bias the drive dog in a direction away from the engagement edge of the nut to form a gap between the drive dog and the engagement edge, the biasing element being further configured to absorb at least a portion of an inertial force of the sleeve and also prevent direct contact between the drive dog and the engagement edge, caused by a change in rotation speed of the sleeve, that would urge the drive dog toward the engagement edge to close the gap.

2. The chuck of claim 1, wherein the biasing element is disposed in the gap between the drive dog and the engagement edge of the nut.

3. The chuck of claim 1 further comprising a second biasing element configured to bias the drive dog in a second direction away from a second engagement edge of the nut.

4. The chuck of claim 1, wherein the sleeve comprises an inner sleeve and an outer sleeve, wherein the outer sleeve is configured to transfer rotational force to the inner sleeve, and the inner sleeve is configured to transfer the rotational force to the nut, and wherein the drive dog is disposed on the inner sleeve.

5. The chuck of claim 1, wherein the biasing element comprises a spring.

6. The chuck of claim 1, wherein the biasing element comprises a wave spring.

7. The chuck of claim 1, wherein the biasing element comprises a coil spring.

8. The chuck of claim 1, wherein the biasing element comprises a resilient cushion.

9. A chuck for use with a powered driver having a rotatable drive shaft, the chuck comprising:
   a body comprising an axial bore and a plurality of passageways that intersect with the axial bore;
   a plurality of jaws movably disposed in the plurality of passageways;
   a nut in operative communication with the plurality of jaws such that movement of the nut in a closing direction tightens the plurality of jaws and movement of the nut in an opening direction loosens the plurality of jaws;
   a sleeve in operative communication with a drive dog configured to drive the nut during manual rotation of the sleeve to cause rotation of the nut; and
   a biasing element configured to bias the drive dog in a direction away from an engagement edge of the nut to form a gap between the drive dog and the engagement edge, the biasing element being further configured to absorb at least a portion of an inertial force of the sleeve and also prevent direct contact between the drive dog and the engagement edge, caused by a change in rotation speed of the sleeve, that would urge the drive dog toward the engagement edge of the nut to close the gap.

10. The chuck of claim 9, wherein the biasing element is disposed in the gap between the drive dog and the engagement edge of the nut.

11. The chuck of claim 9 further comprising a second biasing element configured to bias the drive dog in a second direction away from a second engagement edge of the nut.

12. The chuck of claim 9, wherein the sleeve comprises an inner sleeve and an outer sleeve, wherein the outer sleeve is configured to transfer rotational force to the inner sleeve, and the inner sleeve is configured to transfer the rotational force to the nut, and wherein the drive dog is disposed on the inner sleeve.

13. The chuck of claim 9, wherein the biasing element comprises a spring.

14. The chuck of claim 9, wherein the biasing element comprises a wave spring.

15. The chuck of claim 9, wherein the biasing element comprises a coil spring.

16. The chuck of claim 9, wherein the biasing element comprises a resilient cushion.

17. A chuck for use with a powered driver having a rotatable drive shaft, the chuck comprising:

a body comprising a nose section and a tail section, the tail section being configured to rotate with the rotatable drive shaft and the nose section comprising an axial bore, the body further comprising a plurality of passageways that intersect with the axial bore;

a plurality of jaws movably disposed in the plurality of passageways;

a nut rotatably mounted about the body and in operative communication with the jaws such that rotation of the nut in a closing direction moves the jaws toward an axis of the axial bore and rotation of the nut in an opening direction moves the jaws away from the axis of the axial bore;

a sleeve rotatably mounted about the body, the sleeve comprising an inner sleeve and an outer sleeve, wherein the inner sleeve comprises a protrusion and the inner sleeve is configured to transfer rotational force applied to the outer sleeve to the nut, wherein the inner sleeve comprises a drive dog configured to engage with an engagement edge of the nut during manual rotation of the outer sleeve to cause rotation of the nut, wherein the outer sleeve comprises a tab configured to rotate toward the protrusion of the inner sleeve during manual rotation of the outer sleeve; and a biasing element configured to bias the tab in a direction away from the protrusion to form a gap between the tab and the protrusion, the biasing element being further configured to absorb at least a portion of an inertial force of the outer sleeve caused by a change in rotation speed of the outer sleeve that would urge the tab toward the protrusion and close the gap.

18. The chuck of claim 17, wherein the biasing element is disposed in the gap between the tab and the protrusion.

19. The chuck of claim 17, wherein the biasing element comprises a spring.

20. The chuck of claim 17, wherein the biasing element comprises a wave spring, a coil spring, or a resilient cushion.

* * * * *